No. 763,399. PATENTED JUNE 28, 1904.
S. HUGHES.
JOURNAL BOX OR BEARING FOR ROLL SHAFTS.
APPLICATION FILED FEB. 6, 1904.
NO MODEL.
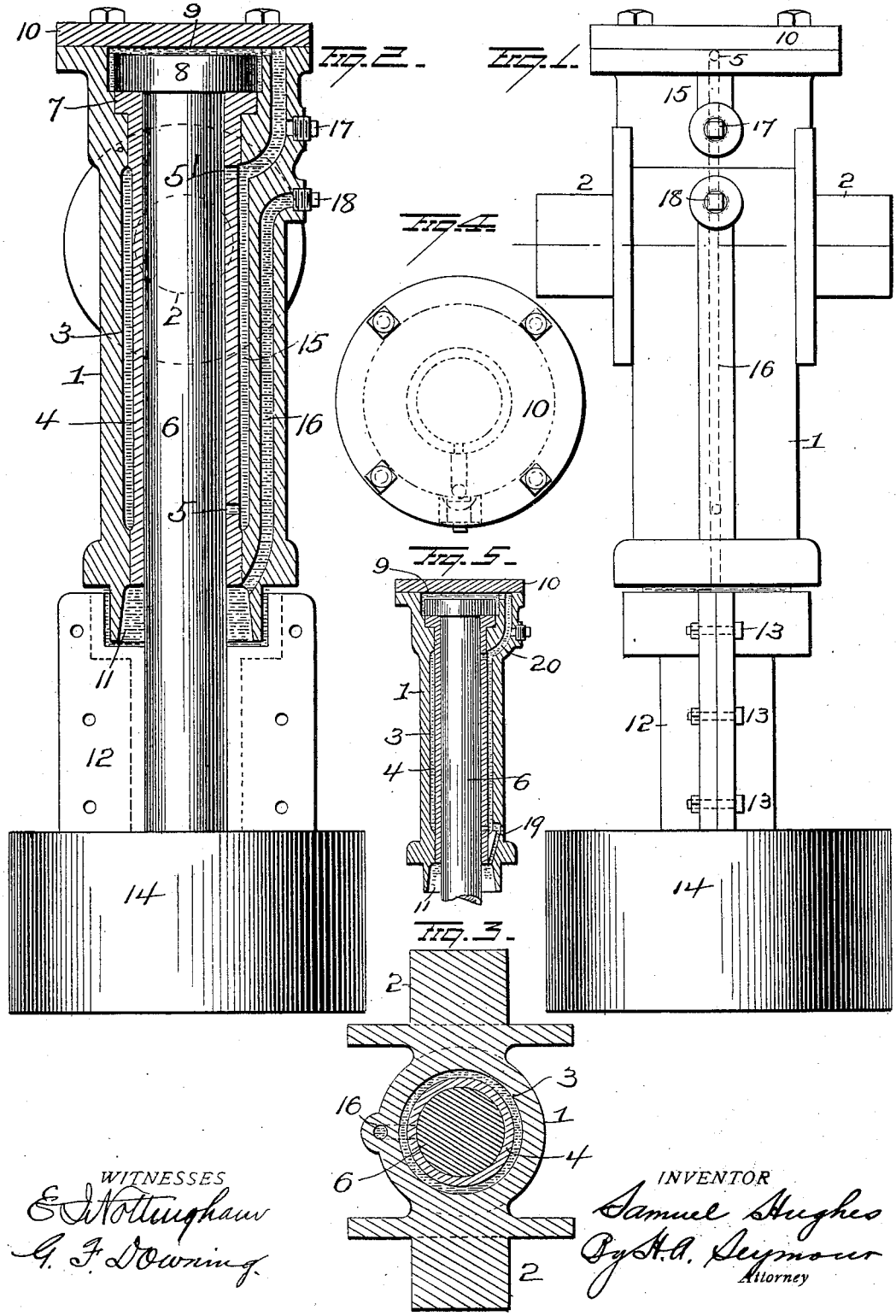

No. 763,399. Patented June 28, 1904.

UNITED STATES PATENT OFFICE.

SAMUEL HUGHES, OF SUMMERVILLE, SOUTH CAROLINA.

JOURNAL BOX OR BEARING FOR ROLL-SHAFTS.

SPECIFICATION forming part of Letters Patent No. 763,399, dated June 28, 1904.

Application filed February 6, 1904. Serial No. 192,384. (No model.)

*To all whom it may concern:*

Be it known that I, SAMUEL HUGHES, a resident of Summerville, in the county of Dorchester and State of South Carolina, have invented certain new and useful Improvements in Journal Boxes or Bearings for Roll-Shafts; and I do hereby declare the following to be a full, clear, and exact description of the invention, such as will enable others skilled in the art to which it appertains to make and use the same.

My invention relates to an improved journal box or bearing for roll-shafts, particularly adapted for use on roll-shafts in grinding or pulverizing machines such as disclosed in my former applications for patent, one of which was filed July 11, 1902, Serial No. 115,158, and the other filed June 11, 1903, Serial No. 161,111, the object of the invention being to provide an improved bearing of this character with improved means for supplying or feeding lubricant, such as grease, to the bearings.

With this object in view the invention consists in certain novel features of construction and combinations and arrangements of parts, as will be more fully hereinafter described, and pointed out in the claims.

In the accompanying drawings, Figure 1 is a view in elevation of a pulverizing-roll and bearing therefor. Fig. 2 is a view in longitudinal section thereof. Fig. 3 is a view in cross-section on the line A A of Fig. 1. Fig. 4 is a top plan view of Fig. 1, and Fig. 5 is a view in longitudinal section illustrating a modification.

1 represents a bearing sleeve or cylinder provided with supporting-trunnions 2 at opposite sides and is cored to form an annular lubricant-chamber 3 around a tubular bushing 4, having ducts 5 for conveying lubricant to the roll-shaft 6, mounted in said bushing. The upper end of bushing 4 is made with an annular enlargement 7 to rest in a corresponding recess in cylinder 1, and the roll-shaft 6 has an enlarged head 8 supported on the upper end of the bushing. It will thus be seen that both the bushing and shaft are supported against any possibility of their downward movement, and the cylinder is made with a lubricant-chamber 9 around the head and is closed by a top plate 10, secured by means of screws or otherwise to the cylinder-top.

The lower end of cylinder 1 is made hollow to form a lubricant-pocket 11 and is contracted to enter a pocket in the upper end of a dust-collar 12. This dust collar or trap is composed of two castings having side flanges secured together by bolts 13, said collar being thus secured to the shaft, so as to rotate with it, and filling the space between the roll 14 on the lower end of the shaft and the cylinder 1, thus absolutely preventing any entrance of dust and grit to the bearing, and as the dust collar or trap cannot fall or be jarred downward it cannot become displaced in use.

Lubricant-channels 15 and 16 are formed in the wall of cylinder 1, the former supplying lubricant to the annular chamber 3 and the upper chamber 9, and the channel 16 supplies the lubricant to the pocket 11. These channels or ducts 15 and 16 have plugged inlets 17 and 18, respectively, both of which are located above the supporting-trunnions 2, so that lubricant can be supplied without displacing the cylinder.

As a lubricant I preferably employ grease and force it to the several chambers by a pump or otherwise.

In Fig. 5 I illustrate a modified form of bearing which can be conveniently made with the bearings now in use. In this form of my invention a duct or channel 19 connects the annular chamber 3 with the pocket 11, and hence the single lubricant-supply channel 20 is all that is necessary to supply both chambers 3 and 11, as well as the lubricant-chamber 9 at the top.

In both forms of bearing I prefer to employ grease rather than liquid, as I find that the grease is retained in the bearing better than liquid.

A great many slight changes might be made in the general form and arrangement of the parts described without departing from my invention. Hence I do not restrict myself to the precise details set forth, but consider myself at liberty to make such slight changes and alterations as fairly fall within the spirit and scope of my invention.

Having fully described my invention, what

I claim as new, and desire to secure by Letters Patent, is—

1. The combination with a roll-shaft bearing-cylinder, of a bushing therein having an annular lubricant-chamber around the same and ducts therethrough, and a shaft in said bushing having an enlarged head at its upper end located in a lubricant-chamber in the cylinder, said cylinder having a channel in the side thereof through which lubricant is forced to both chambers.

2. The combination with a roll-shaft bearing-cylinder, of a bushing therein having an annular lubricant-chamber around the same, and ducts therethrough, a roll-shaft in said bushing having a roll at its lower end, a dust trap or collar on the shaft between the roll and lower end of the cylinder inclosing the lower end of the latter, said cylinder having lubricant-chambers formed in its upper and lower ends, and having lubricant-supply channels in its side wall for conveying lubricant to all of said chambers, and plugged inlets for said channels.

3. The combination with a cylinder-bearing, having a lubricant-pocket in its lower end, a bushing in said cylinder having an annular lubricant-chamber around the same, a shaft passing through said bushing, a roll secured on the lower end of said shaft, a dust trap or collar surrounding the shaft and inclosing the same between the roll and cylinder and also inclosing the lower end of the latter, and said cylinder having a lubricant-channel in its side wall communicating at its lower end with said pocket.

In testimony whereof I have signed this specification in the presence of two subscribing witnesses.

SAML. HUGHES.

Witnesses:
W. L. DICK,
JAS. J. CORCORAN.